Patented Jan. 25, 1938

2,106,182

UNITED STATES PATENT OFFICE 2,106,182

PROCESS OF REACTING ALKALI METAL ACETYLIDES WITH ALKYLENE OXIDES AND PRODUCTS THEREBY PRODUCED

Oscar Robert Kreimeier, Woodstown, N. J., assignor to E. I. du Pont de Nemours & Company, Wilmington, Del., a corporation of Delaware No Drawing. Application July 20, 1936, Serial No. 91,624

13 Claims. (Cl. 260—156)

This invention relates to unsaturated alcohols, and to a process for preparing them. More particularly, it relates to a process for preparing beta-alkynylethanols, especially beta-ethynylethanols, from alkylene oxides and very soluble and reactive forms of alkali metal acetylides in solution in liquid ammonia.

Certain beta-alkynylethanols have been prepared heretofore by the Grignard reaction or by removing hydrohalide from halogenated unsaturated carbinols. An alternative method for preparing beta-alkynylethanols which is simpler and which permits the use of less hazardous solvents, diluents or reaction media than the aforementioned processes, has now been discovered.

This invention has as an object a process for preparing beta-ethynylethanols. A further object is a process for preparing beta-alkynylethanols. A still further object is certain beta-alkynylethanols produced by these new processes. Other objects will appear hereinafter.

These objects are accomplished by the following invention which consists in reacting an alkali metal with an excess of liquid ammonia in the presence of an alkali metal oxide and of an ammonia-soluble hydrated salt of a ferrous metal, reacting the solution of alkali metal amide thus formed with acetylene or equivalent hydrocarbon, and finally reacting the resulting alkali metal acetylide in situ with an alkylene oxide. All three steps are carried out in liquid ammonia as one continuous process. Sodium is a typical alkali metal, sodium oxide a suitable alkali metal oxide, ferric nitrate enneahydrate a typical hydrated ferrous metal salt, and ethylene oxide a typical alkylene oxide.

The invention described herein rests upon the discovery that beta-alkynylethanols can be obtained in excellent yields and in a high state of purity by reacting alkylene oxides with a reactive and soluble form of sodium or other alkali metal acetylide which is in turn prepared from a reactive and soluble variety of sodium or other alkali metal amide. The prepaartion of this sodamide, which forms the first step of the present invention, is described by Vaughn, Vogt and Nieuwland (J. A. C. S. 56, 2120) and consists in reacting sodium with excess liquid ammonia in the presence of catalytic proportions of alkali metal oxides and of ammonia-soluble hydrated ferrous metal (i. e., iron, cobalt or nickel) salts. The second step of the present invention, also mentioned by Vaughn, Vogt and Nieuwland, is to react the alkali metal amide in situ (i. e., without isolating it from the liquid ammonia in which it is formed) with acetylene or equivalent hydrocarbon to form an alkali metal acetylide of a variety which is particularly reactive. The third and final step of the present process, which is also new in itself, is to react the alkali metal acetylide in situ with the selected alkylene oxide. In this last step, the reaction is usually complete in about four hours. The ammonia is then evaporated off, the residue is treated with water, and the resulting solution or suspension is acidified to liberate the beta-alkynylethanol, which is subsequently purified by conventional means.

The catalysts used in the first step of the process are especially active and in the presence of excess liquid ammonia rapidly convert the alkali metal to the alkali metal amide. In the absence of these catalysts the alkali metal reacts only slowly with liquid ammonia to form the alkali metal amide. After the latter is formed the solution may, if desired, be freed of any suspended catalyst by diluting it with liquid ammonia to about twice its volume and filtering. The alkali metal amide obtained by the catalytic method under discussion is more reactive and more soluble in liquid ammonia than is the corresponding alkali metal amide prepared by other methods. However, in order that it retain these properties to the greatest degree it should be reacted with the acetylenic hydrocarbon in the liquid ammonia in which it is formed instead of being isolated therefrom.

The invention having thus been outlined in its general scope and objects, the following exemplifications thereof are added in illustration and not in limitation. Unless otherwise stated, parts given are by weight.

EXAMPLE I.—BETA-ETHYNYLETHANOL

A. Preparation of sodamide

One (1) part of sodium was added to a mechanically stirred mixture of 0.3 part of finely powdered ferric nitrate enneahydrate

(Fe(NO$_3$)$_3$.9H$_2$O)

in 385 parts of liquid ammonia, contained in a reaction vessel of approximately four times the capacity of these reactants. Air was bubbled through the solution until the blue color was discharged (to form oxides of sodium in the reaction mixture) and 46 parts (2 mols) of sodium were then added in small pieces. The reaction set in at once and in ten to twenty minutes the blue color had changed to gray, indicating the end of the conversion.

B. Preparation of sodium acetylide

Acetylene gas was purified by passing it successively through 10% sulfuric acid, through 10% sodium hydroxide, through a trap cooled in a methanol-solid carbon dioxide bath, and finally through calcium chloride drying towers. From the calcium chloride towers it was passed rapidly into the liquid ammonia solution of sodamide prepared as described under (A) above, until the color of the solution changed from gray to black, the temperature of the reaction mixture being maintained at about —50° C. This change in color indicates that sodamide has completely reacted with acetylene to form sodium acetylide.

C. Preparation of the carbinol

Eighty-eight (88) parts (2 mols) of ethylene oxide were cooled to 0° C. and weighed into a closed container having attached to it an exit tube or pipe. The container was immersed in warm water and the ethylene oxide allowed to distil slowly into the solution of sodium acetylide in liquid ammonia prepared as described under (B) above. The reaction mixture was stirred for about four hours, the volume of the solution being maintained by the addition of liquid ammonia and the temperature being maintained at about —50° C. The ammonia was then allowed to evaporate at room temperature. The residue was dissolved in 300 parts of water and acetic acid added in amount sufficient to acidify the solution to litmus. The solution was steam distilled and the distillate saturated with potassium carbonate. The water-insoluble layer was separated, dried, and distilled. The main fraction of the distillate, beta-ethynylethanol, was a colorless, water-soluble liquid, boiling at 127°–127.5° C.

EXAMPLE II.—METHYLETHYNYLETHANOL

One hundred (100) parts of propylene oxide were reacted with a solution of sodium acetylide in liquid ammonia prepared according to the procedure described in Example I. Methylethynylethanol, a colorless, oily liquid of B. P. 125°–130° C. and $N_D^{25}$ 1.4225, was obtained.

The acetylenic hydrocarbons suitable for use in the second step of the present invention may be expressed comprehensively by the general formula $HC \equiv CR$, where R is hydrogen or a monovalent hydrocarbon radical. They may also be called acetylenic hydrocarbons having at least one acetylenic hydrogen atom. The alkali metal acetylides which are formed and used in situ in the third step of the process have the comprehensive formula of $MC \equiv CR$, where M is an alkali metal and R is hydrogen or a monovalent hydrocarbon radical. Examples of suitable specific acetylenes which may be used in the second step are acetylene, methyl-acetylene, ethylacetylene, n-butylacetylene, n-dodecylacetylene, phenylacetylene, tert-butylacetylene, n-amylacetylene, n-hexylacetylene, n-nonylacetylene, n-decylacetylene, vinylacetylene, diacetylene, etc. Acetylene is preferred. When the acetylenic compounds are liquids or solids, they may conveniently be added as such in the desired quantities to the liquid ammonia solution of alkali metal amide.

Alkylene oxides which may be used in this invention may be represented by the general formula

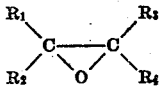

where $R_1$, $R_2$, $R_3$, and $R_4$ are hydrogen or monovalent hydrocarbon radicals such as alkyl, cycloalkyl, aryl and aralkyl. Examples of suitable specific alkylene oxides are ethylene oxide, propylene oxide, ethylethylene oxide (butylene oxide), alpha,alpha-dimethylethylene oxide, alpha,alpha'-dimethylethylene oxide, isopropylethylene oxide, alpha-methyl-alpha-ethylethylene oxide, alpha-methyl-alpha-ethylethylene oxide, trimethylethylene oxide, alpha-methyl-alpha-propylethylene oxide, alpha-methyl-alpha,alpha'-diethylethylene oxide, n-hexylethylene oxide, amylene oxide, the various hexene oxides, etc.

In the first step of my invention, I prefer to use sodium and sodium oxide because of their availability and economy. However, they may be replaced wholly or in part by other alkali metals such as lithium, potassium, rubidium and caesium, and by their oxides. The oxide used as a catalyst may or may not be that of the metal reacted. Thus, sodium may be reacted with ammonia which contains potassium oxide therein, or potassium may be reacted with ammonia which contains sodium oxide therein. It has been found to be most convenient to use about 1 to 3%, based on the weight of the alkali metal, of the alkali metal oxide. The sodium or other alkali metal oxide is preferably formed in situ as in the examples, since the addition of alkali metal oxide to the ammonia usually introduces alkali metal hydroxide which adversely affects the desired reaction. While ferric nitrate enneahydrate has been used to exemplify the second catalytic component, any ammonia-soluble hydrated salt of a ferrous metal, i. e., of iron, cobalt or nickel, may be employed. Thus, ferric chloride hexahydrate, ferric bromide hexahydrate, hydrated ferric acetate, hydrated ferric sulfate, ferric nitrate hexahydrate and hydrated nitrates, nitrites, cyanides and thiocyanates generally of iron, cobalt and nickel may be employed. The hydrated ferric nitrates are preferred.

In the third step of the process the alkylene oxide, before it is added to the liquid ammonia solution of the sodium acetylide, may if desired first be dissolved in suitable solvent such as dry ether, hydrocarbons or liquid ammonia. This expedient, however, is not generally necessary or desirable. Any acid may be used to neutralize the alkaline reaction mixture containing the alkynylethanol, among them acetic, formic, nitric and sulfuric acids. Also, as disclosed and claimed in Macallum Serial No. 91,619, filed of even date herewith, ammonium salts such as the halides, in particular ammonium chloride, may be used in the neutralization step. In some cases, it is convenient to isolate the alkynylethanol by extraction with a suitable solvent such as ether. In still other cases, the alkynylethanol can be distilled directly from the alkaline reaction mixtures without neutralization or extraction.

The reaction between the alkali metal and ammonia can be carried out conveniently at the boiling point of ammonia at ordinary pressure, i. e., at about —33° C. By the use of pressure the reaction temperature may be raised, even up to the critical temperature of ammonia, i. e., 132° C. Temperatures lower than —50° C. are not desirable due to the decreased speed of reaction. The remaining steps in the process may be carried out similarly. In general, temperatures of about —50° C. to —30° C. and atmospheric pressure are preferred throughout the entire process. At lower temperatures the solubility of the alkali metal acetylide in liquid ammonia is reduced, and higher temperatures have a tendency to induce polymerization of the alkylene oxide. As a rule, elevated pressures are advantageous only when it is desirable to operate at temperatures above the atmospheric boiling point of ammonia.

The time required in the third step for reacting the alkylene oxide with the alkali metal acetylide will vary with the reactants and temperatures and may range from one to several hours. The reaction is ordinarily completed after four hours, but it may in many instances be extended with advantage to as much as fifteen hours, higher yields being obtained thereby. This feature of the process is discussed in more detail in Macallum Serial No. 91,619, filed of even date herewith. The latter application also shows that with longer reaction periods the alkali metal may tend to act as a catalyst for the formation of the alkynylethanol in the process of excess alkylene oxide and acetylene. For example, yields considerably in excess of 100%, based on the alkali metal, have been obtained in this way.

The process is not limited to any particular proportions of reactants in any one of the three steps except that in the first step an excess of liquid ammonia must be used over that required to react with the alkali metal to form the alkali metal amide, and that in the second step there must be sufficient excess of liquid ammonia to dissolve the alkali metal acetylide as it is formed. These requirements are merely the necessary consequence of the use of liquid ammonia as a single, continuous solvent or reaction medium throughout all the steps of the process. As illustrated in the examples, approximately reacting equivalents of sodium acetylide and alkylene oxide (i. e., 1:1 mol. ratios) are preferred in order to minimize the formation of by-products. The invention, however, is not limited to such proportions. For example if a molecular excess of alkylene oxide over the sodium acetylide is employed, mixtures of products are obtained, viz., the ethynylmonocarbinols together with more or less of ethynyldicarbinols of the type

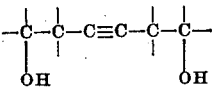

When two or more mols of alkylene oxide are used per mol. of sodium acetylide, as much as 50–70% of the product may be the dicarbinol. (Dicarbinols can, of course, be formed only when acetylene itself is employed.) However, when the alkylene oxide is not used in appreciable excess, the principal reaction which is believed to occur is as follows, the various R's having the meanings previously given:

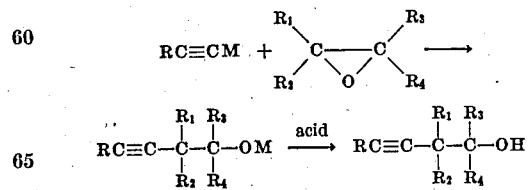

It will be noted that the final products have the skeleton structure

i. e., they are beta-alkynylethanols.

The ethynylcarbinols prepared as described herein may be used for many purposes. For example, their esters with certain acids may be used as plasticizers and solvents for natural and synthetic resins, cellulose derivatives, etc. The carbinols or their derivatives may be used as alcohol denaturants and as insecticides. Their metallic derivatives may be used as anti-knock compounds and as fungicides. The carbinols may also be reduced to vinyl alcohols or to saturated alcohols, and can be hydrated to hydroxyketones. They are also useful as modifying agents for resins wherever alcohols are useful for this purpose.

The process described herein is an alternative method of preparing beta-alkynylethanols without the hazards and expense connected with the use of inflammable reaction media such as ether, hydrocarbon solvents, etc. The new process also avoids the difficulty, hazards and expense incidental to the isolation and storage of unstable compounds such as sodamide and sodium acetylide, and to redissolving or dispersing them in liquid ammonia or the reaction media when they are to be used for preparation of the alkynylethanol, since in this process the compounds are prepared only when and as needed. Moreover, the lower temperatures at which the reactions are carried out minimize any polymerization of the reactants or of products, which might otherwise occur, thus affording better yields and avoiding undesirable by-products. Owing to the fact that the reactants and products are all readily soluble in liquid ammonia, those difficulties are not encountered which are incidental to the use of suspensions such as are necessary when the reactants are only slightly soluble in the reaction medium, i. e., the reaction mixtures remain liquid, do not settle, are easy to handle, stir, pump, etc. The present process differs from the prior art in that alkylene oxides are reacted with alkali metal acetylides in liquid ammonia, whereas in the prior art alkylene oxides are reacted with Grignard reagents in solvents such as ether or hydrohalides are removed from certain halogenated carbinols. An important feature of the present process is the use of the alkali metal amide and the alkali metal acetylide in the liquid ammonia in which they are formed. If these reactants are isolated, they become less reactive and less soluble in liquid ammonia than they were before, and consequently do not react as satisfactorily with the alkylene oxides as they do under the conditions described herein.

In the specification and claims by "ammonia" is meant the compound $NH_3$ and not the solution thereof in water which is ammonium hydroxide. The term "alkyl" is used in the sense of a saturated aliphatic hydrocarbon radical. The term "ferrous metal" is used in the sense of a metal of the class consisting of iron, cobalt and nickel.

The above description and examples are intended to be illustrative only. Any modification of or variation therefrom which conforms to the spirit of the invention is intended to be included within the scope of the claims.

I claim:

1. Process for the preparation of beta-ethynylethanol which comprises reacting 46 parts of sodium with an excess of liquid ammonia in the presence of 1.3 parts of sodium oxide and in the presence of 0.3 part of ferric nitrate enneahydrate, passing acetylene gas into the ammonia solution of sodamide thus prepared at −50° to −40° C., until the gray color thereof changes to black, adding 88 parts of dry ethylene oxide to the sodium acetylide solution thus obtained, maintaining the temperature at −50° to −30° C. for four to fifteen hours, and isolating the beta-ethynylethanol by evaporating the ammonia, dissolving the residue in water, acidifying and steam distilling the aqueous acid solution, and salting out the product from the steam distillate.

2. Process of preparing beta-ethynylethanol which comprises reacting sodium with an excess of liquid ammonia in the presence of sodium oxide and in the presence of ferric nitrate enneahydrate, passing acetylene gas into the solution until the gray color thereof turns to black, adding ethylene oxide at about —50° C., maintaining the temperature at —50° to —30° C. for four to fifteen hours, and isolating the beta-ethynylethanol.

3. Process of preparing methylethynylethanol which comprises reacting sodium with an excess of liquid ammonia in the presence of sodium oxide and in the presence of ferric nitrate enneahydrate, passing acetylene gas into the solution until the gray color thereof turns to black, adding propylene oxide at about —50° C., maintaining the temperature at —50° to —30° C. for four to fifteen hours, and isolating the methylethynylethanol.

4. Process of preparing beta-ethynylethanols which comprises reacting an alkali metal with an excess of liquid ammonia in the presence of an alkali metal oxide and in the presence of an ammonia-soluble hydrated salt of a ferrous metal, passing acetylene gas in excess into the solution thus prepared, then adding at about —40° C. an alkylene oxide, and isolating the beta-ethynylethanol formed.

5. Process of preparing beta-ethynylethanols which comprises reacting an alkali metal with an excess of liquid ammonia in the presence of an alkali metal oxide and in the presence of an ammonia-soluble hydrated salt of a ferrous metal, passing acetylene gas in excess into the solution thus prepared, then adding at about —40° C. an alkylene oxide, maintaining the temperature at —50° C. to —30° C. for four to fifteen hours, and isolating the beta-ethynylethanol formed.

6. Process of preparing ethynylethanols which comprises reacting an alkali metal with an excess of liquid ammonia in the presence of an alkali metal oxide and in the presence of an ammonia-soluble hydrated salt of a ferrous metal, reacting acetylene with the alkali metal amide thus prepared, reacting the resulting alkali metal acetylide with an alkylene oxide, and isolating the ethynylethanol formed.

7. Process of preparing alkynylethanols which comprises reacting an alkali metal with an excess of liquid ammonia in the presence of an alkali metal oxide, and in the presence of an ammonia-soluble hydrated salt of a ferrous metal, reacting an acetylenic hydrocarbon having at least one acetylenic hydrogen with the alkali metal amide thus prepared, reacting the resulting alkali metal acetylide with an alkylene oxide, and isolating the alkynylethanol formed.

8. In the process of preparing alkynylethanols, the step which consists in reacting an alkylene oxide with a liquid ammonia solution of an alkali metal acetylide, said solution being that in which the alkali metal acetylide is formed.

9. The process of claim 8 in which the alkylene oxide and alkali metal acetylide are employed in equimolecular amounts.

10. In the process of preparing alkynylethanols, the step which comprises reacting an alkylene oxide with a liquid ammonia solution of an alkali metal derivative of acetylene, HC≡CH, said solution being that in which the alkali metal derivative is formed.

11. The process of claim 10 in which the alkylene oxide is employed in excess of the stoichiometrical amount.

12. The process of claim 10 wherein at least two mols of alkylene oxide are employed per mol. of alkali metal acetylide.

13. Methyl-beta-ethynylethanol obtainable by reacting propylene oxide with sodium acetylide by the process of claim 3.

OSCAR ROBERT KREIMEIER.